US010198614B2

(12) United States Patent
Ji et al.

(10) Patent No.: US 10,198,614 B2
(45) Date of Patent: Feb. 5, 2019

(54) METHOD AND DEVICE FOR FINGERPRINT RECOGNITION

(71) Applicant: Beijing Xiaomi Mobile Software Co., Ltd., Beijing (CN)

(72) Inventors: Chuanshun Ji, Beijing (CN); Hui Du, Beijing (CN); Qiang Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 73 days.

(21) Appl. No.: 15/417,594

(22) Filed: Jan. 27, 2017

(65) Prior Publication Data

US 2017/0220847 A1 Aug. 3, 2017

(30) Foreign Application Priority Data

Feb. 1, 2016 (CN) .......................... 2016 1 0068890
Apr. 6, 2016 (CN) .......................... 2016 1 0210599

(51) Int. Cl.
*G06K 9/00* (2006.01)
*G06F 17/30* (2006.01)
*G06K 9/52* (2006.01)

(52) U.S. Cl.
CPC ..... *G06K 9/00087* (2013.01); *G06F 17/3053* (2013.01); *G06F 17/30256* (2013.01); *G06K 9/00013* (2013.01); *G06K 9/52* (2013.01)

(58) Field of Classification Search
CPC ........ G06F 21/32; G06F 21/316; G06F 21/36; G06F 3/0482; G06F 1/1616;

(Continued)

(56) References Cited

U.S. PATENT DOCUMENTS 6,393,139 B1 * 5/2002 Lin .................. G06F 21/316
382/124
6,421,453 B1 * 7/2002 Kanevsky ............ G06F 21/316
340/5.2

(Continued)

FOREIGN PATENT DOCUMENTS

CN 101231692 A 7/2008
CN 105099701 A 11/2015

(Continued)

OTHER PUBLICATIONS

English version of International Search Report of PCT/CN2016/094651, mailed from the State Intellectual Property Office of China dated Nov. 7, 2016.

(Continued)

*Primary Examiner* — Aklilu K Woldemariam
(74) *Attorney, Agent, or Firm* — Finnegan, Henderson, Farabow, Garrett & Dunner LLP (57) ABSTRACT

The present disclosure relates to a method and device for fingerprint recognition. The method includes: acquiring one or more recognition records indicating one or more fingerprint templates, among at least two pre-stored fingerprint templates, that have matched one or more input fingerprints during previous fingerprint recognition processes; re-ranking the at least two pre-stored fingerprint templates according to the one or more recognition records; and comparing, when receiving a new input fingerprint, the new input fingerprint with the at least two pre-stored fingerprint templates in an order according to rankings of the at least two pre-stored fingerprint templates that have been re-ranked until one of the at least two fingerprint templates matches the new input fingerprint or until all of the at least two fingerprint templates have been compared with the new input fingerprint.

9 Claims, 4 Drawing Sheets

(58) Field of Classification Search
CPC .................. G06F 1/1684; G06F 21/31; G06F
2221/2113; G06F 3/0481; G06F 3/04883;
G06F 17/30244; G10H 2210/066; G10H
1/0008; G10H 2210/086; G10H 3/125;
G10H 2210/056; G10H 2210/061; G10H
2230/021; G10H 2250/031; G10H
2250/161; G06K 9/00087; G06K
2009/00932; G06K 9/00013; G06K
9/00073; G06K 9/2018; G06K 9/0002;
G06K 9/0004; G06K 9/00046; G06K
9/0008; G06K 9/00093; G06K 9/00885;
G06K 9/00892; G06K 9/52; G06K 9/62;
G06K 9/00033; G06K 9/00288; G06K
9/00221; G06K 9/00255; G06K 9/00926;
G06K 9/6214; G06K 9/6255; G06K
9/6272; H04L 63/083; H04L 63/0861;
H04L 63/105; H04L 9/3231; H04W
12/06; G07C 9/00158; G08B 13/19613;
G08B 13/19645; G08B 13/01
USPC ......... 382/115, 116, 118, 124, 125, 126, 127
See application file for complete search history.

(56) References Cited

U.S. PATENT DOCUMENTS

| | | | |
|---|---|---|---|
| 7,006,671 B2 | 2/2006 | Yamaguchi | |
| 7,266,224 B2* | 9/2007 | Sukegawa | G06K 9/00288 382/118 |
| 7,382,904 B2 | 6/2008 | Lee | |
| 2001/0026634 A1 | 10/2001 | Yamaguchi | |
| 2003/0035569 A1* | 2/2003 | Chau | G06K 9/00067 382/124 |
| 2004/0091138 A1 | 5/2004 | Lee | |
| 2006/0013448 A1 | 1/2006 | Itoh et al. | |
| 2006/0075881 A1* | 4/2006 | Streitenberger | G10H 1/0008 84/609 |
| 2006/0075884 A1* | 4/2006 | Streitenberger | G10H 3/125 84/616 |
| 2008/0049987 A1* | 2/2008 | Champagne | G06K 9/00026 382/124 |
| 2009/0161924 A1* | 6/2009 | Lu | G06K 9/00006 382/124 |
| 2010/0094879 A1* | 4/2010 | Donnelly | G06F 17/30011 707/749 |
| 2013/0163957 A1* | 6/2013 | Ikizyan | G06K 9/00751 386/241 |
| 2015/0146945 A1 | 5/2015 | Han et al. | |
| 2015/0286855 A1* | 10/2015 | Neskovic | G06K 9/00073 382/125 |
| 2015/0294131 A1* | 10/2015 | Neskovic | G06K 9/00026 382/125 |
| 2016/0026854 A1* | 1/2016 | Hwang | G06K 9/6272 382/118 |
| 2016/0092724 A1 | 3/2016 | Jeong | |
| 2016/0328600 A1* | 11/2016 | Che | G06T 7/11 |

FOREIGN PATENT DOCUMENTS

| | | |
|---|---|---|
| CN | 105469033 A | 4/2016 |
| CN | 105825164 A | 8/2016 |
| CN | 105825172 A | 8/2016 |
| EP | 0924123 A2 | 6/1999 |
| EP | 1418486 A2 | 5/2004 |
| JP | 5-61964 | 3/1993 |
| JP | 10-280755 A | 10/1998 |
| JP | 2001-266151 A | 9/2001 |
| JP | 2006-018677 A | 1/2006 |
| JP | 2007036365 A | 2/2007 |
| JP | 2007-122529 A | 5/2007 |
| JP | 2008-242954 A | 10/2008 |
| JP | 2008-276359 A | 11/2008 |
| JP | 2011059791 A | 3/2011 |
| KR | 10-1316805 B1 | 10/2013 |
| RU | 2355307 C2 | 5/2009 |
| WO | WO 02/35479 A1 | 5/2002 |
| WO | WO 2015/126744 A1 | 8/2015 |

OTHER PUBLICATIONS

Extended European Search Report issued in European Patent Application No. 17152989.4, from the European Patent Office, dated Jun. 28, 2017.

Russian Office Action and Search Report issued in Russian Patent Application No. 2016141944/08 (067208), dated Oct. 24, 2017.

International Search Report of PCT/CN2016/094651, mailed from the State Intellectual Property Office of China dated Jul. 11, 2016.

* cited by examiner

METHOD AND DEVICE FOR FINGERPRINT RECOGNITION

CROSS-REFERENCE TO RELATED APPLICATIONS

This application is based upon and claims priority to Chinese Patent Application No. 201610068890.9, filed Feb. 1, 2016, and Chinese Patent Application No. 201610210599.0, filed Apr. 6, 2016, the entire contents of which are incorporated herein by reference.

TECHNICAL FIELD

The present disclosure generally relates to computers and, more particularly, to a method and device for fingerprint recognition.

BACKGROUND

Fingerprint recognition function has become a standard function provided in most mobile terminals, such as smart phones. In conventional technologies, the fingerprint recognition function can be realized using a fingerprint template database, fingerprint recognition software, and a fingerprint sensor. The fingerprint template database stores fingerprint templates entered by a user, and each template includes a fingerprint image of one finger of the user. During the fingerprint recognition, the fingerprint sensor captures a fingerprint image of the user, and the fingerprint recognition software checks the captured fingerprint image against the fingerprint templates in the template database. If this produces a successful match, information indicating the successful match is returned.

SUMMARY

According to a first aspect of the present disclosure, there is provided a method for fingerprint recognition, comprising: acquiring one or more recognition records indicating one or more fingerprint templates, among at least two pre-stored fingerprint templates, that have matched one or more input fingerprints during previous fingerprint recognition processes; re-ranking the at least two pre-stored fingerprint templates according to the one or more recognition records; and comparing, when receiving a new input fingerprint, the new input fingerprint with the at least two pre-stored fingerprint templates in an order according to rankings of the at least two pre-stored fingerprint templates that have been re-ranked until one of the at least two fingerprint templates matches the new input fingerprint or until all of the at least two fingerprint templates have been compared with the new input fingerprint.

According to a second aspect of the present disclosure, there is provided a device for fingerprint recognition, comprising: a processor; and a memory storing instructions that, when executed by the processor, cause the processor to: acquire one or more recognition records indicating one or more fingerprint templates, among at least two pre-stored fingerprint templates, that have matched one or more input fingerprints during previous fingerprint recognition processes; re-rank the at least two pre-stored fingerprint templates according to the one or more recognition records; and compare, when receiving a new input fingerprint, the new input fingerprint with the at least two pre-stored fingerprint templates in an order according to rankings of the at least two pre-stored fingerprint templates that have been re-ranked until one of the at least two fingerprint templates matches the new input fingerprint or until all of the at least two fingerprint templates have been compared with the new input fingerprint.

According to a third aspect of the present disclosure, there is provided a non-transitory computer-readable storage medium having stored therein instructions that, when executed by a processor of an electronic device, cause the electronic device to: acquire one or more recognition records indicating one or more fingerprint templates, among at least two pre-stored fingerprint templates, that have matched one or more input fingerprints during previous fingerprint recognition processes; re-rank the at least two pre-stored fingerprint templates according to the one or more recognition records; and compare, when receiving a new input fingerprint, the new input fingerprint with the at least two pre-stored fingerprint templates in an order according to rankings of the at least two pre-stored fingerprint templates that have been re-ranked until one of the at least two fingerprint templates matches the new input fingerprint or until all of the at least two fingerprint templates have been compared with the new input fingerprint.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Exemplary embodiments of the present disclosure are presented by the above drawings, and more detailed descriptions will be made below. The drawings and descriptions are not for limiting the scope of the present disclosure in any way, but for illustrating the idea of the present disclosure to one of ordinary skill in this art with some exemplary embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the invention as recited in the appended claims. Methods consistent with the present disclosure, such as the exemplary methods described below, can be implemented in an electronic device having the fingerprint recognition function, such as, for example, a smart phone, a tablet computer, an ebook reader, or a smart wearable device.

Figure 1:
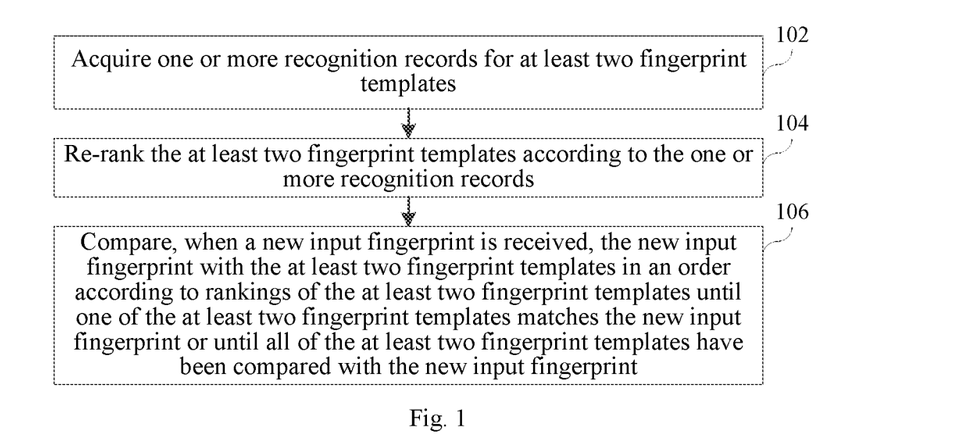
FIG. 1 is a flow chart of a method for fingerprint recognition according to an exemplary embodiment.

FIG. 1 is a flow chart of a method for fingerprint recognition according to an exemplary embodiment. As shown in FIG. 1, at 102, one or more recognition records are acquired. The one or more recognition records are configured to indicate one or more fingerprint templates, among at least two pre-stored fingerprint templates, that have previously successfully matched an input fingerprint when the fingerprint recognition is performed. At 104, the at least two fingerprint templates are re-ranked according to the one or more recognition records. In some embodiments, each of the at least two fingerprint templates is assigned a ranking, with a higher ranking fingerprint template being used earlier during a fingerprint recognition process. According to the present disclosure, the rankings can be modified according to the one or more recognition records. At 106, when a new input fingerprint is received, comparison of the new input fingerprint with the at least two fingerprint templates is performed in an order according to the rankings of the at least two fingerprint templates until one of the at least two fingerprint templates matches the new input fingerprint or until all of the at least two fingerprint templates have been compared with the new input fingerprint.

Figure 2:
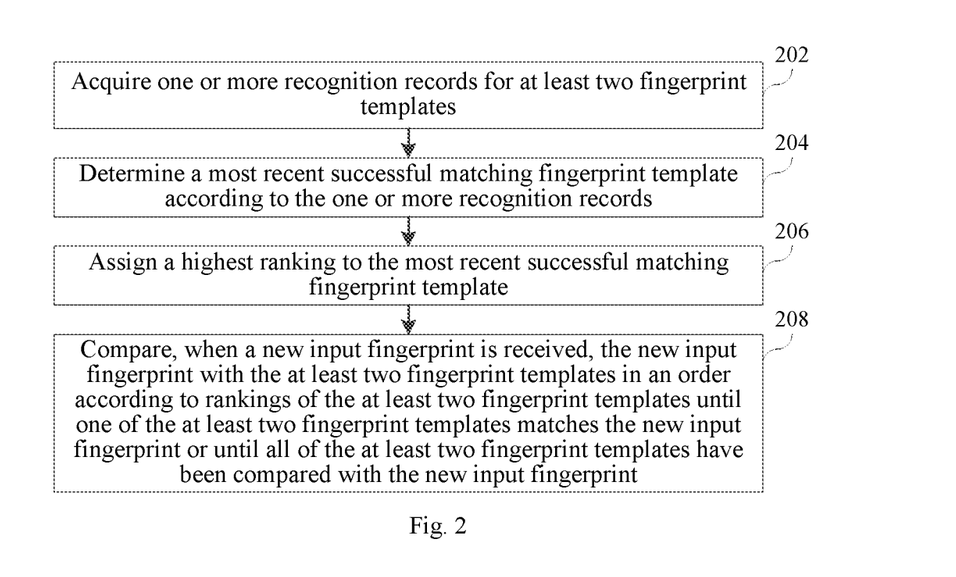
FIG. 2 is a flow chart of a method for fingerprint recognition according to another exemplary embodiment.

FIG. 2 is a flow chart of a method for fingerprint recognition according to another exemplary embodiment. As shown in FIG. 2, at 202, one or more recognition records are acquired. The one or more recognition records are configured to indicate one or more fingerprint templates, among at least two pre-stored fingerprint templates, that have previously successfully matched an input fingerprint when the fingerprint recognition is performed.

The electronic device having the fingerprint recognition function can collect an input fingerprint by a fingerprint collection unit, and then compare the collected input fingerprint with at least one pre-set fingerprint template. If the input fingerprint successfully matches one of the at least one pre-set fingerprint template, it is determined that the user inputs a correct fingerprint. If the input fingerprint does not match any of the at least one pre-set fingerprint template, it is determined that the user inputs a wrong fingerprint.

In some embodiments, every time after the electronic device compares the collected input fingerprint with the at least one pre-set fingerprint template, the electronic device can generate and store one recognition record according to the compare result. For example, for a successful matching, the generated recognition record can include a comparison time at which the comparison is conducted, a matching-successful identifier indicating the matching was successful, and a matching-template identifier indicating the fingerprint template that matches the collected input fingerprint. For a failed matching, the generated recognition record can include the comparison time and a failure identifier indicating the match fails.

In some embodiments, the electronic device can set one successful recognition record for each fingerprint template, and separately set one failed recognition record for failed matchings. For example, every time when the electronic device compares the collected input fingerprint with the at least one pre-set fingerprint template, if the collected input fingerprint successfully matches one of the at least one pre-set fingerprint template, the comparison time is added into the successful recognition record corresponding to the matching fingerprint template. If the collected input fingerprint does not match any of the at least one pre-set fingerprint template, the comparison time is added into the failed recognition record.

At 204, a most recent successful matching fingerprint template is determined according to the one or more recognition records. For example, if every time after the electronic device compares the collected input fingerprint against the at least one pre-set fingerprint template, the electronic device generates and stores one recognition record according to the compare result, then the electronic device can acquire the recognition record generated when a most recent successful match is produced, and determine the fingerprint template included in that recognition record as the most recent successful matching fingerprint template. In this embodiment, when acquiring the one or more recognition records (202 described above), the electronic device can just acquire the recognition record generated when the most recent successful match is produced.

As another example, if the electronic device sets one successful recognition record for each fingerprint template, and separately sets one failed recognition record for failed matches, the electronic device can acquire the comparison time of the most recent recognition from the successful recognition record of each fingerprint template, compare the acquired comparison times with each other, and determine the fingerprint template corresponding to the most recent comparison time as the most recent successful matching fingerprint template.

At 206, a highest ranking is assigned to the most recent successful matching fingerprint template among the at least two fingerprint templates.

In some embodiments, the operations in 202 to 206 can be performed after an input fingerprint successfully matches a fingerprint template. That is, every time after the user inputs the fingerprint and a successful matching is produced, the electronic device can assign the highest ranking to the fingerprint template corresponding to the successful matching. That is, the fingerprint template corresponding to this successful matching is ranked as a top one template.

At 208, when a new input fingerprint is received, comparison of the new input fingerprint with the at least two fingerprint templates is performed in an order according to the rankings of the at least two fingerprint templates until one of the at least two fingerprint templates matches the new input fingerprint or until all of the at least two fingerprint templates have been compared with the new input fingerprint. During the comparison of the new input fingerprint with the at least two fingerprint templates in order, the electronic device determines whether a successful matching is produced every time after the comparison is performed against one fingerprint template. If the matching fails, the electronic device continues to compare the new input fingerprint with another fingerprint template. If the matching is successful, a matching result indicating the successful matching is output, and the matching procedure ends.

In some embodiments, every time after a fingerprint recognition is finished, the electronic device assigns the highest ranking to the matching fingerprint template corresponding to that fingerprint recognition. A method consistent with the present disclosure is simple to implement and no more additional space is needed. That is, the electronic device assumes the fingerprint template corresponding to that fingerprint recognition likely will be used again next time, and ranking the fingerprint template highest can save time for next recognition. Correspondingly, fingerprint templates that are less frequently used will be re-ranked lower in the fingerprint template database after a period of time.

According to the present disclosure, the most frequently used fingerprint templates can have relatively high rankings as compared to less frequently used fingerprint templates.

In some embodiments, the electronic device also considers how frequently a fingerprint template is used when assigning a ranking to the fingerprint template. For example, the electronic device can acquire N recent successful matchings (N being an integer greater than or equal to one, such as three), and determine whether the N recent successful matchings correspond to a same fingerprint template. If the N recent successful matchings correspond to the same fingerprint template, the fingerprint template corresponding to the N recent successful matchings, i.e., the most recent successful matching fingerprint template, is assigned the highest ranking among the at least two fingerprint templates.

Figure 3:
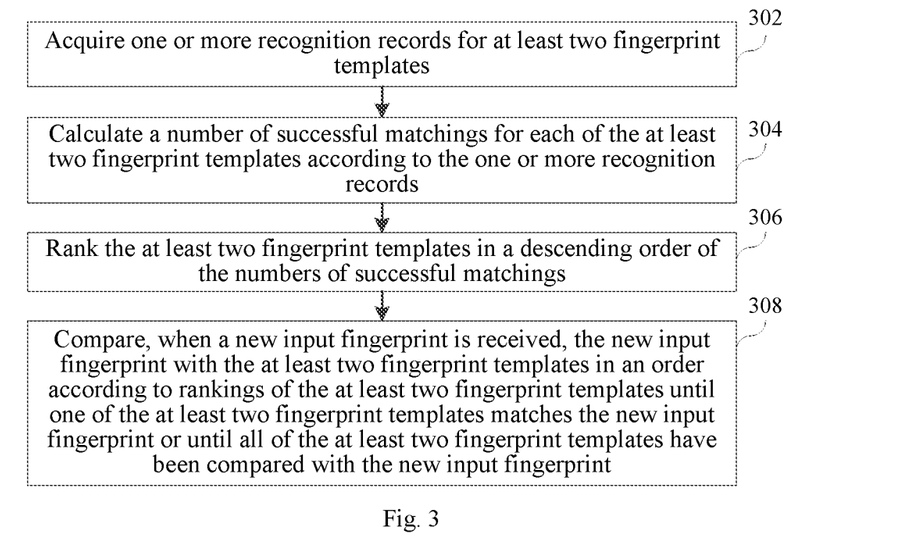
FIG. 3 is a flow chart of a method for fingerprint recognition according to another exemplary embodiment.

FIG. 3 is a flow chart of a method for fingerprint recognition according to another exemplary embodiment. As shown in FIG. 3, at 302, one or more recognition records are acquired. The one or more recognition records are configured to indicate one or more fingerprint templates, among at least two pre-stored fingerprint templates, that have previously successfully matched an input fingerprint when the fingerprint recognition is performed. The electronic device can generate and store the one or more recognition records using a method consistent with the present disclosure, such as one of the above-described exemplary methods. The operation at 302 is similar to that at 202, and thus detailed descriptions thereof are omitted.

At 304, a number of successful matchings for each of the at least two fingerprint templates is calculated according to the one or more recognition records.

In the embodiments that every time after the electronic device compares a collected input fingerprint with at least one pre-set fingerprint template, the electronic device generates and stores one recognition record according to the comparison result, the electronic device can perform statistics on the acquired one or more recognition records to acquire the number of successful matchings for each fingerprint template. In actual application situations, users' usage habits may vary at different time periods and different users may use the same electronic device during different time periods. For example, a user may be accustomed to unlocking the electronic device using his/her forefinger for a previous time period, and the corresponding fingerprint template is the fingerprint template of the user's forefinger. However, in a relatively recent time period, the user may be accustomed to unlocking the electronic device using his/her thumb, and the corresponding fingerprint template is thus the fingerprint template of the user's thumb. Further, in a most recent time period, another user uses the electronic device, and the corresponding fingerprint template is the fingerprint template of the other user. In view of this, in some embodiments, when acquiring the one or more recognition records (302 above), the electronic device only acquires one or more recognition records within a preset time period before a current time, such as, for example, one week before the current time.

In the embodiments that the electronic device sets one successful recognition record for each fingerprint template and separately sets one failed recognition record for failed matchings, the electronic device can take the number of all comparison times in a successful recognition record corresponding to each fingerprint template as the number of successful matchings corresponding to that fingerprint template. In some embodiments, the electronic device only records the comparison times of successful matchings within a preset time period before the current time in the successful recognition record corresponding to each fingerprint template, and deletes the comparison times outside the preset time period.

At 306, the at least two fingerprint templates are ranked in a descending order according to the numbers of successful matches. For example, the electronic device can assign the highest ranking to the fingerprint template that has the largest number of successful matchings, as determined according to the acquired one or more recognition records, and assign the next highest ranking to the fingerprint template that has the second largest number of successful matchings, and so on.

If the numbers of successful matchings for two or more of the at least two fingerprint templates are the same, the two or more fingerprint templates are ranked in an order of comparison times of most recent successful matchings for the two or more fingerprint templates, from most recent to oldest.

For example, if the electronic device determines that there are two fingerprint templates, e.g., fingerprint template 1 and fingerprint template 2, having the largest number of successful matchings according to the acquired one or more recognition records, the electronic device can obtain the comparison times of the most recent successful matches for fingerprint templates 1 and 2. For example, the comparison time of the most recent successful matching for fingerprint template 1 is two hours ago and the comparison time of the most recent successful matching for fingerprint template 2 is twenty-four hours ago, i.e., the comparison time of the most recent successful matching for fingerprint template 1 is closer to the current time than that for fingerprint template 2, then the electronic device assigns the highest ranking to fingerprint template 1 and assigns the second highest ranking to fingerprint template 2.

At 308, when a new input fingerprint is received, comparison of the new input fingerprint with the at least two fingerprint templates is performed in an order according to the rankings of the at least two fingerprint templates until one of the at least two fingerprint templates matches the new input fingerprint or until all of the at least two fingerprint templates have been compared with the new input fingerprint.

According to the above-described exemplary method, the number of previous successful matches for each fingerprint template is calculated, which can reflect how often the corresponding finger is used. As such, it can be assured that the most recently and often used fingers are first used for subsequent recognitions. For an often used finger, the fingerprint template corresponding to the finger can receive the highest ranking. Even though the user may occasionally use a less often used finger to perform the fingerprint recognition, the fingerprint template corresponding to the less frequently used finger would not be assigned the highest ranking. In these embodiments, additional storage space is needed to record the numbers of times the templates are used.

In some embodiments, the templates are input into the fingerprint template database at different times. As such, one fingerprint template that is input later in time may be used very frequently, but the total number of successful matchings corresponding to this template may be smaller than a template that is input earlier in time but less frequently used. Thus, in some embodiments, when re-ranking the templates, the electronic device can calculate a success frequency for each of the at least two fingerprint templates, and re-rank the at least two fingerprint templates in a descending order of the success frequencies of the at least two fingerprint templates.

The success frequency of a fingerprint template refers to a frequency that the fingerprint template successfully matches an input fingerprint. Further, if the success frequencies of two or more of fingerprint templates are the same, the two or more fingerprint templates are ranked according to the times of the most recent successful matchings of the two or more fingerprint templates, from most recent to oldest.

For example, the one or more recognition records acquired by the electronic device can also include the time of each fingerprint recognition. According to the time of each fingerprint recognition and the fingerprint template that matches an input fingerprint when the fingerprint recognition is performed, the electronic device can calculate the success frequency corresponding to each of the at least two fingerprint templates, and rank the at least two fingerprint templates in a descending order of the success frequencies corresponding to individual ones of the at least two fingerprint templates. That is, for each fingerprint template, in addition to determining the number of successful matches corresponding to the fingerprint template according to the acquired one or more recognition records, the electronic device also obtains the comparison time of a first successful matching and the comparison time of a most recent successful matching corresponding to the fingerprint template in the acquired one or more recognition records, calculates a time interval between the comparison time of the first successful matching and the comparison time of the most recent successful matching corresponding to the fingerprint template, and calculates the success frequency corresponding to the fingerprint template according to the number of successful matchings corresponding to the fingerprint template and the time interval between the comparison time of the first successful matching and the comparison time of the most recent successful matching corresponding to the fingerprint template. The electronic device then re-ranks the at least two fingerprint templates in a descending order of the success frequencies.

For example, the electronic device stores three fingerprint templates, e.g., fingerprint template 1, fingerprint template 2, and fingerprint template 3. The comparison time of the first successful matching of fingerprint template 1 is two hundred days ago, the comparison time of the last successful matching of fingerprint template 1 is twenty days ago, and the number of (all previous) successful matchings is three hundred and sixty. The comparison time of the first successful matching of fingerprint template 2 is one hundred days ago, the comparison time of the last successful matching of fingerprint template 2 is thirty days ago, and the number of (all previous) successful matchings is two hundred and eighty. The comparison time of the first successful matching of fingerprint template 3 is ten days ago, the comparison time of the last successful matching of fingerprint template 3 is the current time, and the number of successful matchings is one hundred. Then, the electronic device can perform calculations to determine that the success frequencies corresponding to fingerprint templates 1, 2, and 3 are two times per day, four times per day, and ten times per day, respectively. The electronic device can rank the three fingerprint templates in an order of fingerprint template 3, fingerprint template 2, and fingerprint template 1.

Exemplary devices for fingerprint recognition consistent with embodiments of the present disclosure are described below. Functions of the exemplary devices are similar to the above-described exemplary methods, and thus details thereof are not repeated. A device according to the present disclosure can be realized as whole or a part of an electronic device having a fingerprint recognition function by software, hardware, or a combination thereof. For example, the electronic device can be a smart phone, a tablet computer, an ebook reader, a smart wearable device, etc.

Figure 4:
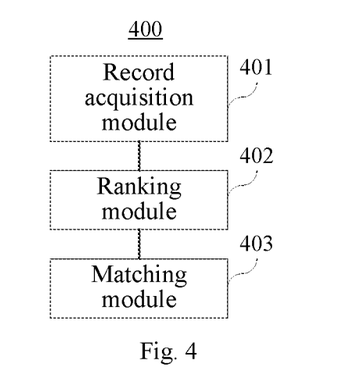
FIG. 4 is a block diagram of a device for fingerprint recognition according to an exemplary embodiment.

FIG. 4 is a block diagram of a fingerprint recognition device 400 according to an exemplary embodiment. As shown in FIG. 4, the fingerprint recognition device 400 includes a record acquisition module 401, a ranking module 402, and a matching module 403. The record acquisition module 401 is configured to acquire one or more recognition records configured to indicate one or more fingerprint templates, among at least two pre-stored fingerprint templates, that have previously successfully matched an input fingerprint when the fingerprint recognition is performed. The ranking module 402 is configured to re-rank the at least two fingerprint templates according to the one or more recognition records. The matching module 403 is configured to, when a new input fingerprint is received, compare the new input fingerprint with the at least two fingerprint templates in an order according to the rankings of the at least two fingerprint templates until one of the at least two fingerprint templates matches the new input fingerprint or until all of the at least two fingerprint templates have been compared with the new input fingerprint.

Figure 5:
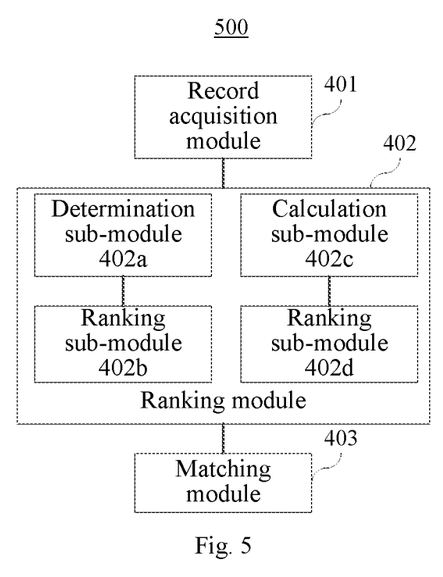
FIG. 5 is a block diagram of a device for fingerprint recognition according to another exemplary embodiment.

FIG. 5 is a block diagram of a fingerprint recognition device 500 according to another exemplary embodiment. As shown in FIG. 5, the fingerprint recognition device 500 includes the record acquisition module 401, the ranking module 402, and the matching module 403.

In some embodiments, as shown in FIG. 5, the ranking module 402 includes a determination sub-module 402*a* and a ranking sub-module 402*b*. The determination sub-module 402*a* is configured to determine a most recent successful matching fingerprint template according to the one or more recognition records. The ranking sub-module 402*b* is configured to assign a highest ranking to the most recent successful matching fingerprint template among the at least two fingerprint templates.

In some embodiments, as shown in FIG. 5, the ranking module 402 includes a calculation sub-module 402*c* and a ranking sub-module 402*d*. The calculation sub-module 402*c* is configured to calculate a number of successful matchings for each of the at least two fingerprint templates according to the one or more recognition records. The ranking sub-module 402*d* is configured to rank the at least two fingerprint templates in a descending order of the numbers of successful matches.

In some embodiments, the ranking sub-module 402*d* is further configured to, if the numbers of successful matchings of two or more of the at least two fingerprint templates are the same, rank the two or more fingerprint templates in an order of comparison times of most recent successful matchings of the two or more fingerprint templates, from most recent to oldest.

In some embodiments, the one or more recognition records also include the comparison time of each fingerprint recognition. The ranking module 402 can further include a frequency calculation sub-module. The frequency calculation sub-module is configured to calculate a success frequency corresponding to each of the at least two fingerprints according to the comparison time of each fingerprint recognition and the fingerprint template that matches an input fingerprint when the fingerprint recognition is performed. In these embodiments, the ranking sub-module 402*d* is further configured to rank the at least two fingerprint templates in a descending order of the success frequencies corresponding to individual ones of the at least two fingerprint templates as calculated by the frequency calculation sub-module.

An exemplary embodiment of the present disclosure further provides a device for fingerprint recognition including a processor and a memory storing instructions that, when executed by the processor, cause the processor to perform a method for fingerprint recognition consistent with embodiments of the present disclosure, such as one of the above-described exemplary methods.

Figure 6:
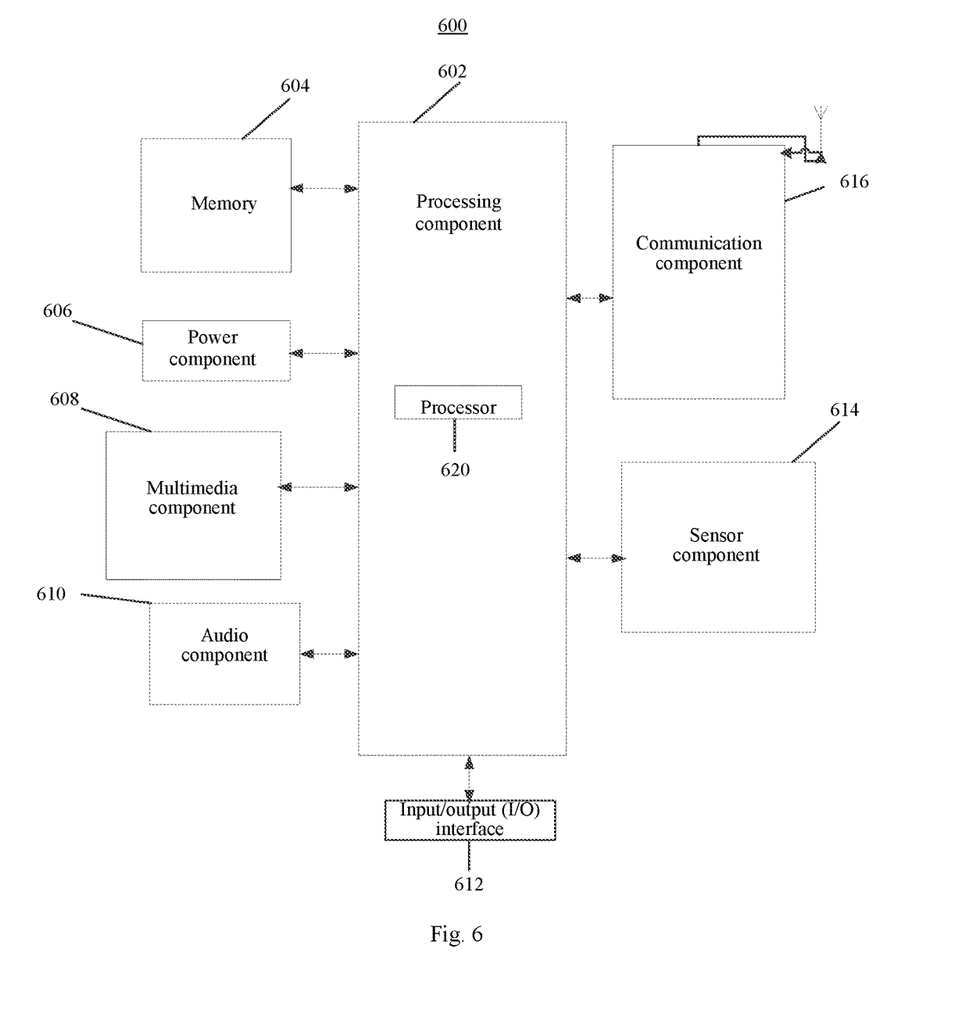
FIG. 6 is a block diagram of a device according to another exemplary embodiment.

FIG. 6 is a block diagram of a device 600 according to another exemplary embodiment. For example, the device 600 may be a mobile phone, a computer, a digital broadcast terminal, a messaging device, a gaming console, a tablet, a medical device, exercise equipment, a personal digital assistant, or the like.

Referring to FIG. 6, the device 600 includes one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For example, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, 3G, or 4G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is also provided a non-transitory computer-readable storage medium including instructions, such as the memory 604 including instructions executable by the processor 620 in the device 600, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

Other embodiments of the invention will be apparent to those skilled in the art from consideration of the specification and practice of the embodiments disclosed here. This application is intended to cover any variations, uses, or adaptations of the disclosure following the general principles thereof and including such departures from the present disclosure as within known or customary practice in the art. It is intended that the specification and examples be considered as exemplary only, with a true scope and spirit of the invention being indicated by the following claims.

According to the present disclosure, one or more recognition records are used to rank fingerprint templates such that the most frequently used or most recently used fingerprint template is assigned the highest ranking. Thus, during a subsequent fingerprint recognition, the most frequently used or most recently used fingerprint template can be first used for comparison. As a result, the time needed for fingerprint recognition is reduced, the speed for fingerprint recognition is increased, and the user experience is improved.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for fingerprint recognition, comprising:
   acquiring one or more recognition records recorded within a preset time period before a current time, the one or more recognition records indicating one or more fingerprint templates, among at least two pre-stored fingerprint templates, that have matched one or more input fingerprints during previous fingerprint recognition processes;
   obtaining a comparison time of a first successful matching and a comparison time of a most recent successful matching corresponding to a fingerprint template indicated in the acquired one or more recognition records;
   calculating a time interval between the comparison time of the first successful matching and the comparison time of the most recent successful matching;
   calculating a success frequency corresponding to the fingerprint template according to a number of successful matchings corresponding to the fingerprint template and the calculated time interval;
   re-ranking the at least two pre-stored fingerprint templates according to at least one of a recency of successful matching or the success frequency of the one or more recognition records, each pre-stored fingerprint template of the at least two pre-stored fingerprint templates comprising a fingerprint image of a finger; and
   comparing, when receiving a new input fingerprint, the new input fingerprint with the at least two pre-stored fingerprint templates in an order according to rankings of the at least two pre-stored fingerprint templates that have been re-ranked until one of the at least two fingerprint templates matches the new input fingerprint or until all of the at least two fingerprint templates have been compared with the new input fingerprint.

2. The method of claim 1, wherein re-ranking the at least two pre-stored fingerprint templates includes:
   determining, among the at least two pre-stored fingerprint templates, a most recent successful matching fingerprint template according to the one or more recognition records; and
   assigning a highest ranking to the most recent successful matching fingerprint template.

3. The method of claim 1, wherein re-ranking the at least two pre-stored fingerprint templates includes:
   calculating a number of successful matchings for each of the at least two pre-stored fingerprint templates according to the one or more recognition records; and
   ranking the at least two pre-stored fingerprint templates in a descending order of the numbers of successful matchings.

4. The method of claim 3, wherein ranking the at least two pre-stored fingerprint templates in the descending order of the numbers of successful matchings includes:
   ranking, if the numbers of successful matchings for two or more fingerprint templates of the at least two pre-stored fingerprint templates are the same, the two or more fingerprint templates in an order of times of most recent successful matches for the two or more fingerprint templates, from most recent to oldest.

5. A device for fingerprint recognition, comprising:
   a processor; and
   a memory storing instructions that, when executed by the processor, cause the processor to:
      acquire one or more recognition records recorded within a preset time period before a current time, the one or more recognition records indicating one or more fingerprint templates, among at least two pre-stored fingerprint templates, that have matched one or more input fingerprints during previous fingerprint recognition processes;
      obtain a comparison time of a first successful matching and a comparison time of a most recent successful matching corresponding to a fingerprint template indicated in the acquired one or more recognition records;
      calculate a time interval between the comparison time of the first successful matching and the comparison time of the most recent successful matching;
      calculate a success frequency corresponding to the fingerprint template according to a number of successful matchings corresponding to the fingerprint template and the calculated time interval;
      re-rank the at least two pre-stored fingerprint templates according to at least one of a recency of successful matching or the success frequency of the one or more recognition records, each pre-stored fingerprint template of the at least two pre-stored fingerprint templates comprising a fingerprint image of a finger; and
      compare, when receiving a new input fingerprint, the new input fingerprint with the at least two pre-stored fingerprint templates in an order according to rankings of the at least two pre-stored fingerprint templates that have been re-ranked until one of the at least two fingerprint templates matches the new input fingerprint or until all of the at least two fingerprint templates have been compared with the new input fingerprint.

6. The device of claim 5, wherein the instructions further cause the processor to:
   determine, among the at least two pre-stored fingerprint templates, a most recent successful matching fingerprint template according to the one or more recognition records; and assign a highest ranking to the most recent successful matching fingerprint template.

7. The device of claim 5, wherein the instructions further cause the processor to:

calculate a number of successful matchings for each of the at least two pre-stored fingerprint templates according to the one or more recognition records; and rank the at least two pre-stored fingerprint templates in a descending order of the numbers of successful matchings.

8. The device of claim 7, wherein the instructions further cause the processor to:

rank, if the numbers of successful matchings for two or more fingerprint templates of the at least two pre-stored fingerprint templates are the same, the two or more fingerprint templates in an order of times of most recent successful matches for the two or more fingerprint templates, from most recent to oldest.

9. A non-transitory computer-readable storage medium having stored therein instructions that, when executed by a processor of an electronic device, cause the electronic device to:

acquire one or more recognition records recorded within a preset time period before a current time, the one or more recognition records indicating one or more fingerprint templates, among at least two pre-stored fingerprint templates, that have matched one or more input fingerprints during previous fingerprint recognition processes;

obtain a comparison time of a first successful matching and a comparison time of a most recent successful matching corresponding to a fingerprint template indicated in the acquired one or more recognition records;

calculate a time interval between the comparison time of the first successful matching and the comparison time of the most recent successful matching;

calculate a success frequency corresponding to the fingerprint template according to a number of successful matchings corresponding to the fingerprint template and the calculated time interval;

re-rank the at least two pre-stored fingerprint templates according to at least one of a recency of successful matching or the success frequency of the one or more recognition records, each pre-stored fingerprint template of the at least two pre-stored fingerprint templates comprising a fingerprint image of a finger; and compare, when receiving a new input fingerprint, the new input fingerprint with the at least two pre-stored fingerprint templates in an order according to rankings of the at least two pre-stored fingerprint templates that have been re-ranked until one of the at least two fingerprint templates matches the new input fingerprint or until all of the at least two fingerprint templates have been compared with the new input fingerprint.

* * * * *